Figure 28:
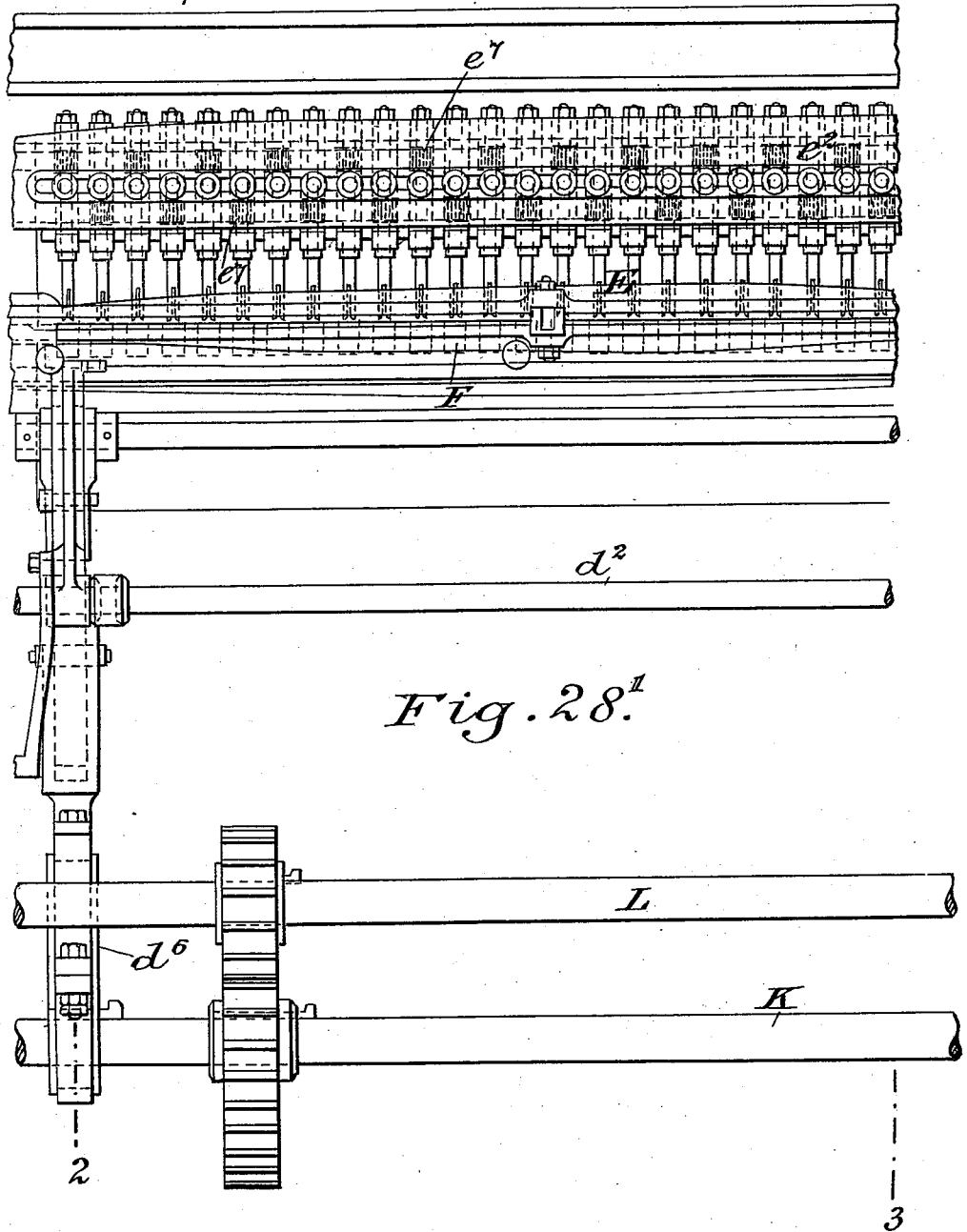

(No Model.) 10 Sheets—Sheet 1.
A. N. PEARSON & R. PENN.
METHOD OF AND APPARATUS FOR MANUFACTURING RECTANGULAR MESHED WIRE NETTING.
No. 507,750. Patented Oct. 31, 1893.
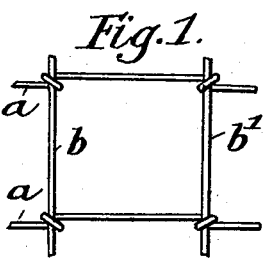
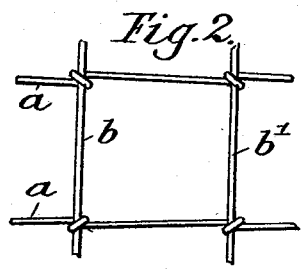
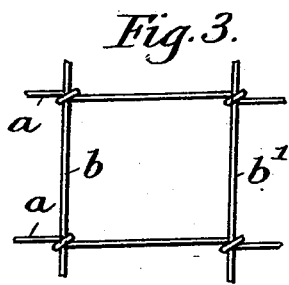
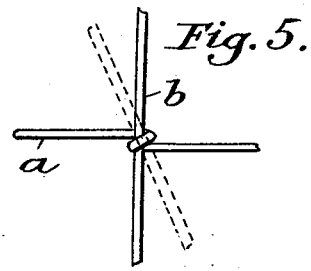
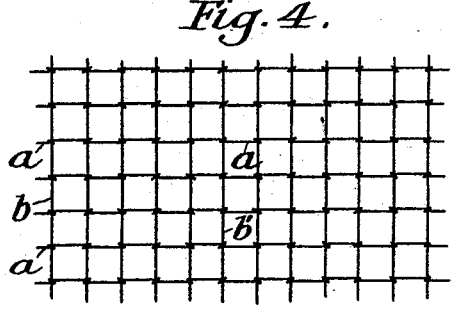

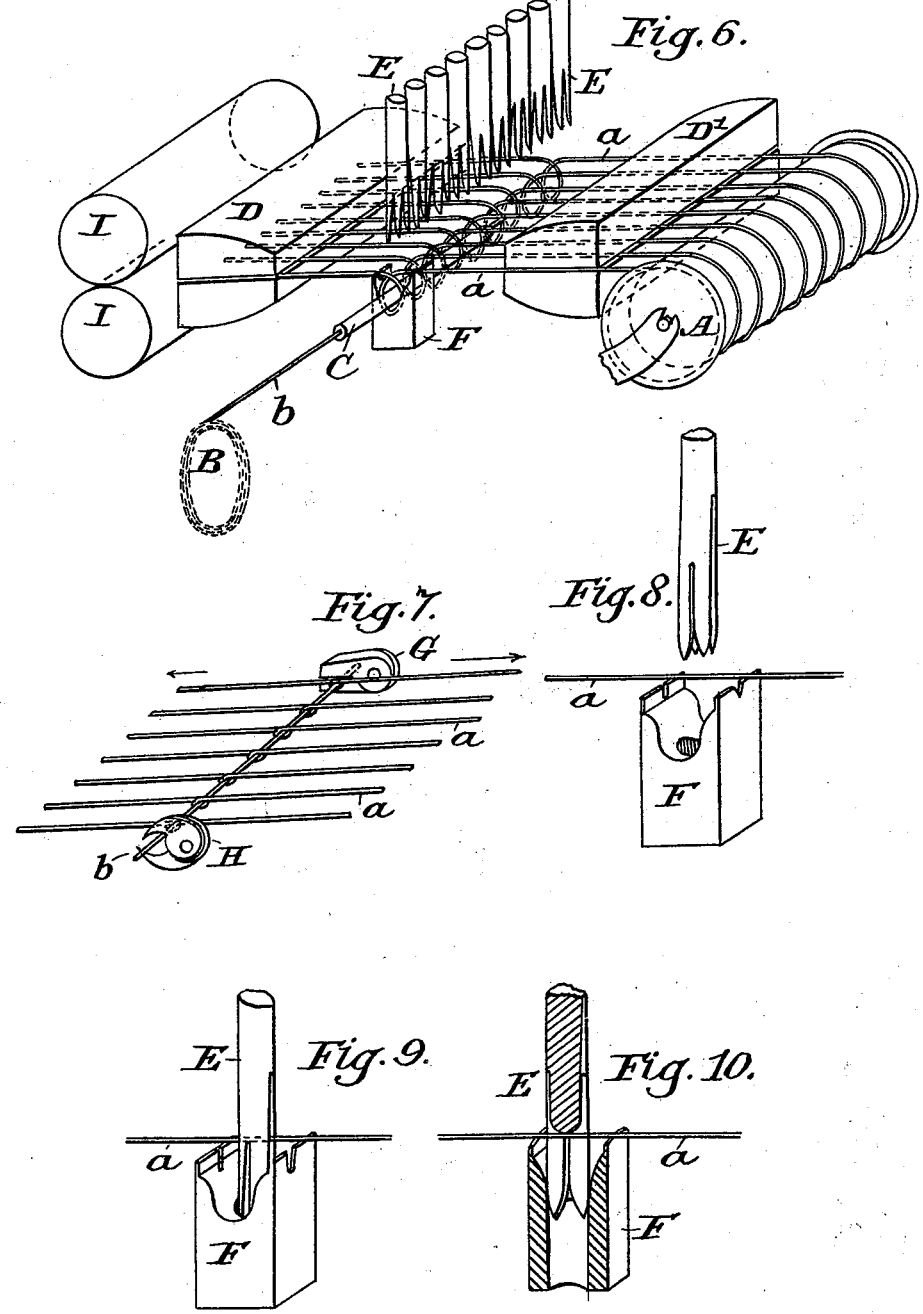

(No Model.) 10 Sheets—Sheet 3.
A. N. PEARSON & R. PENN.
METHOD OF AND APPARATUS FOR MANUFACTURING RECTANGULAR MESHED WIRE NETTING.
No. 507,750. Patented Oct. 31, 1893.
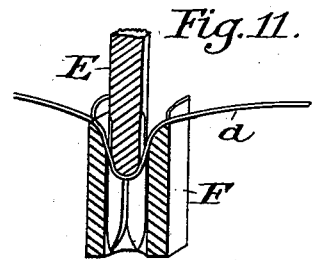
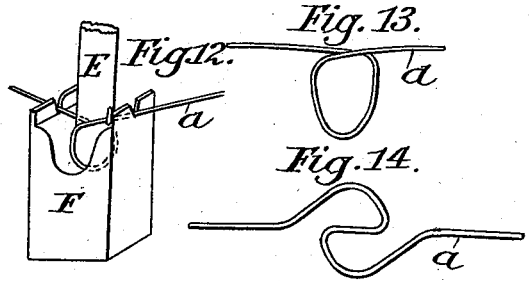
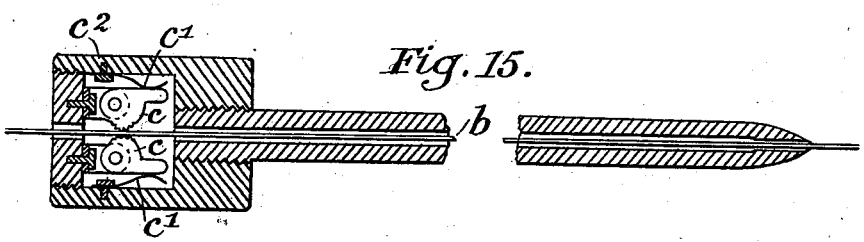
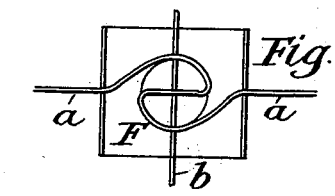
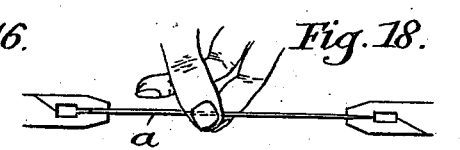
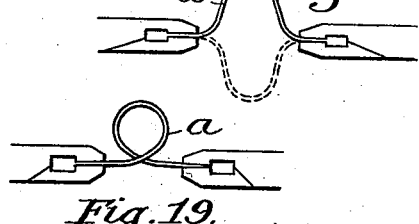
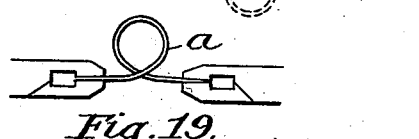
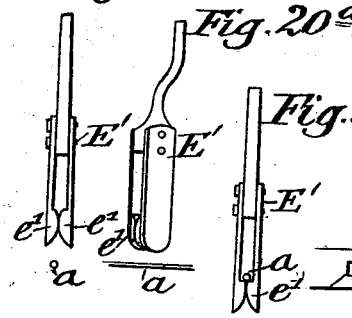
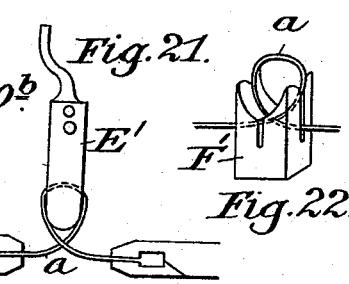
Witnesses:
C. B. Bolton
E. K. Sturtevant
Inventors:
Alfred Naylor Pearson
Robert Penn
By their Attorneys.

(No Model.) 10 Sheets—Sheet 4.
A. N. PEARSON & R. PENN.
METHOD OF AND APPARATUS FOR MANUFACTURING RECTANGULAR MESHED WIRE NETTING.
No. 507,750. Patented Oct. 31, 1893.
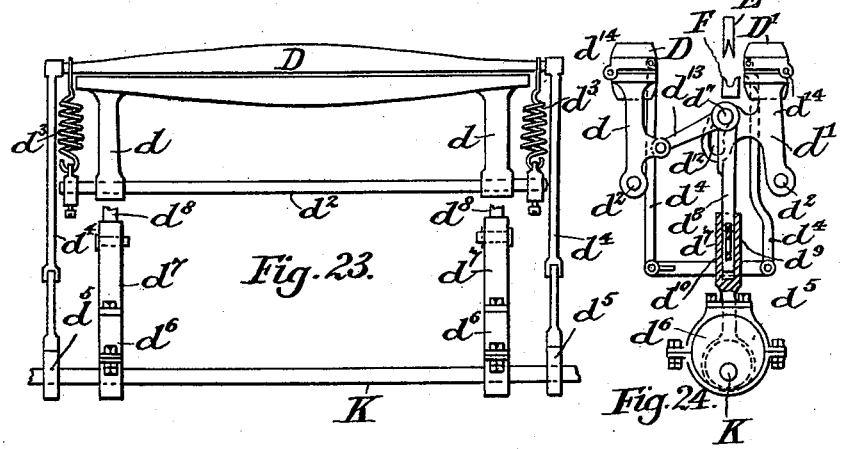
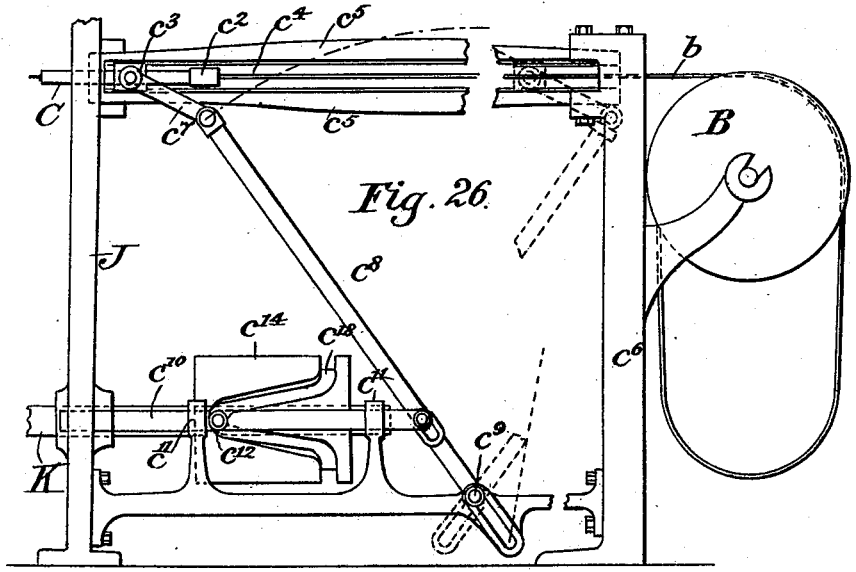
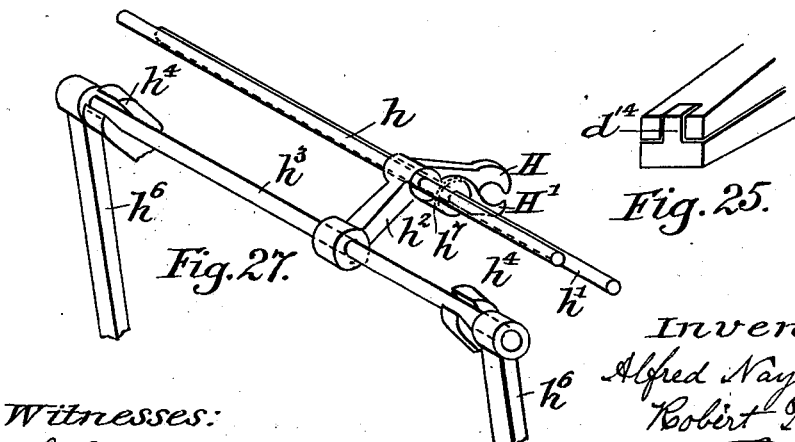
Witnesses:
E. B. Bolton
E. K. Sturtevant
Inventors:
Alfred Naylor Pearson
Robert Penn
By Reinhardt
their Attorneys.

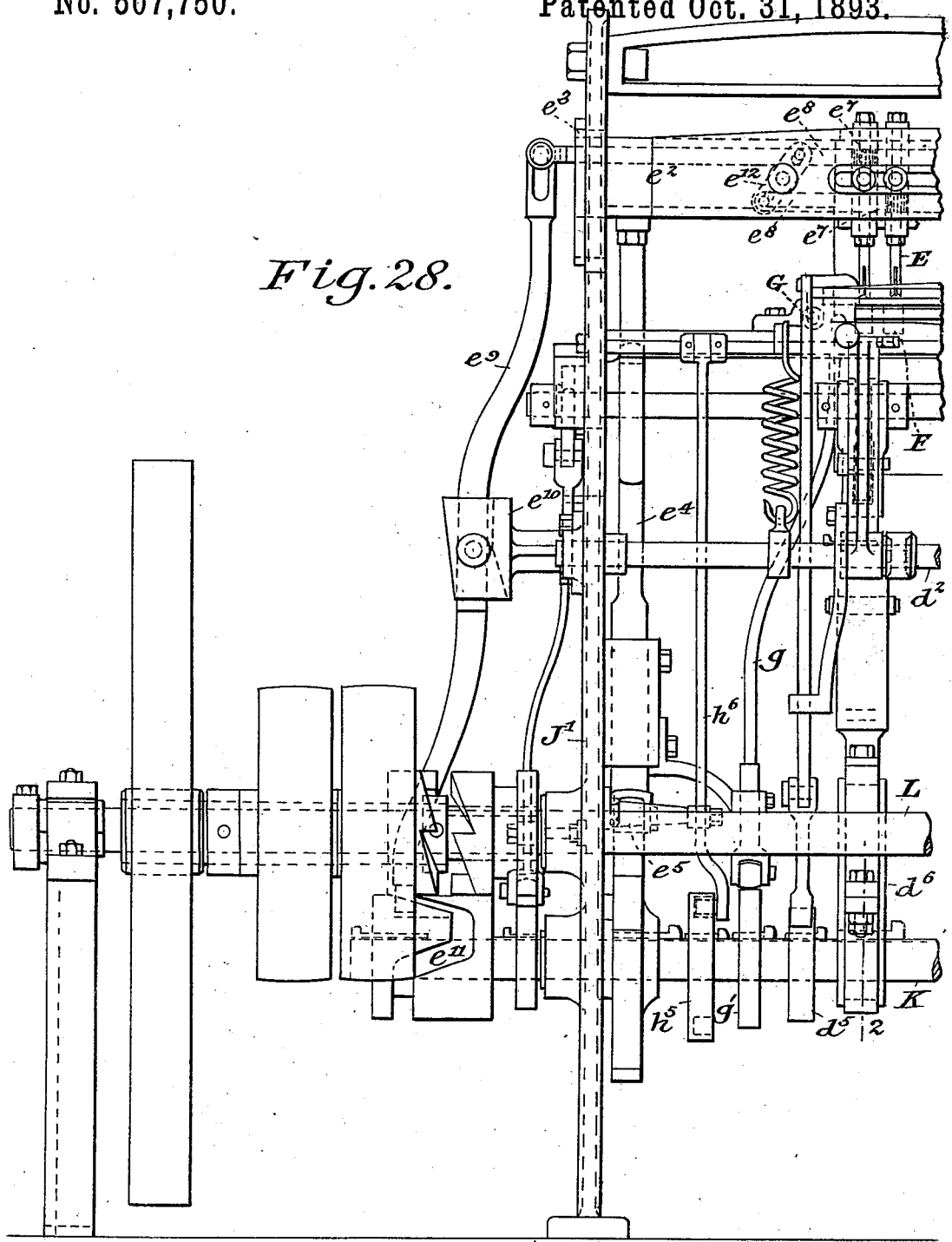

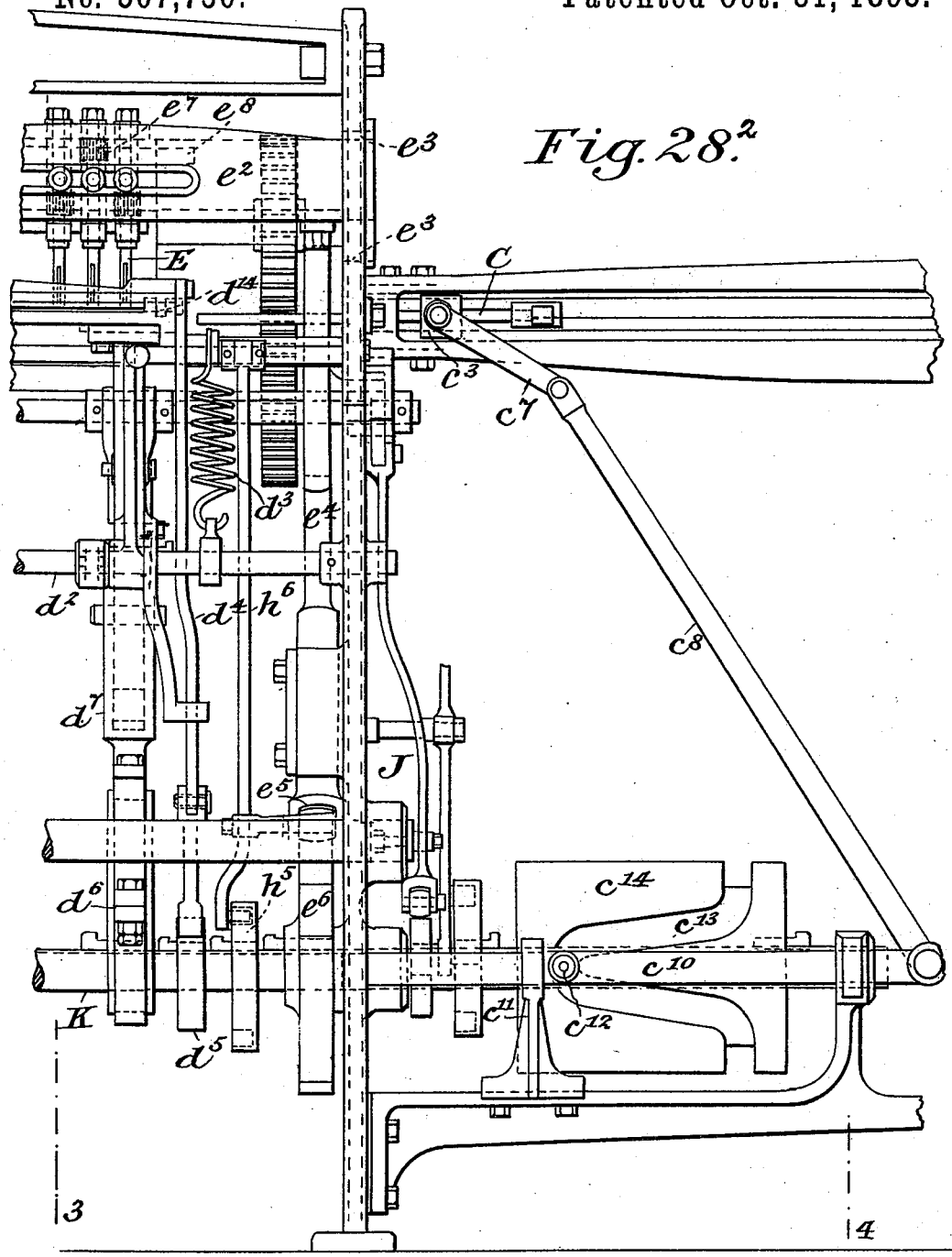

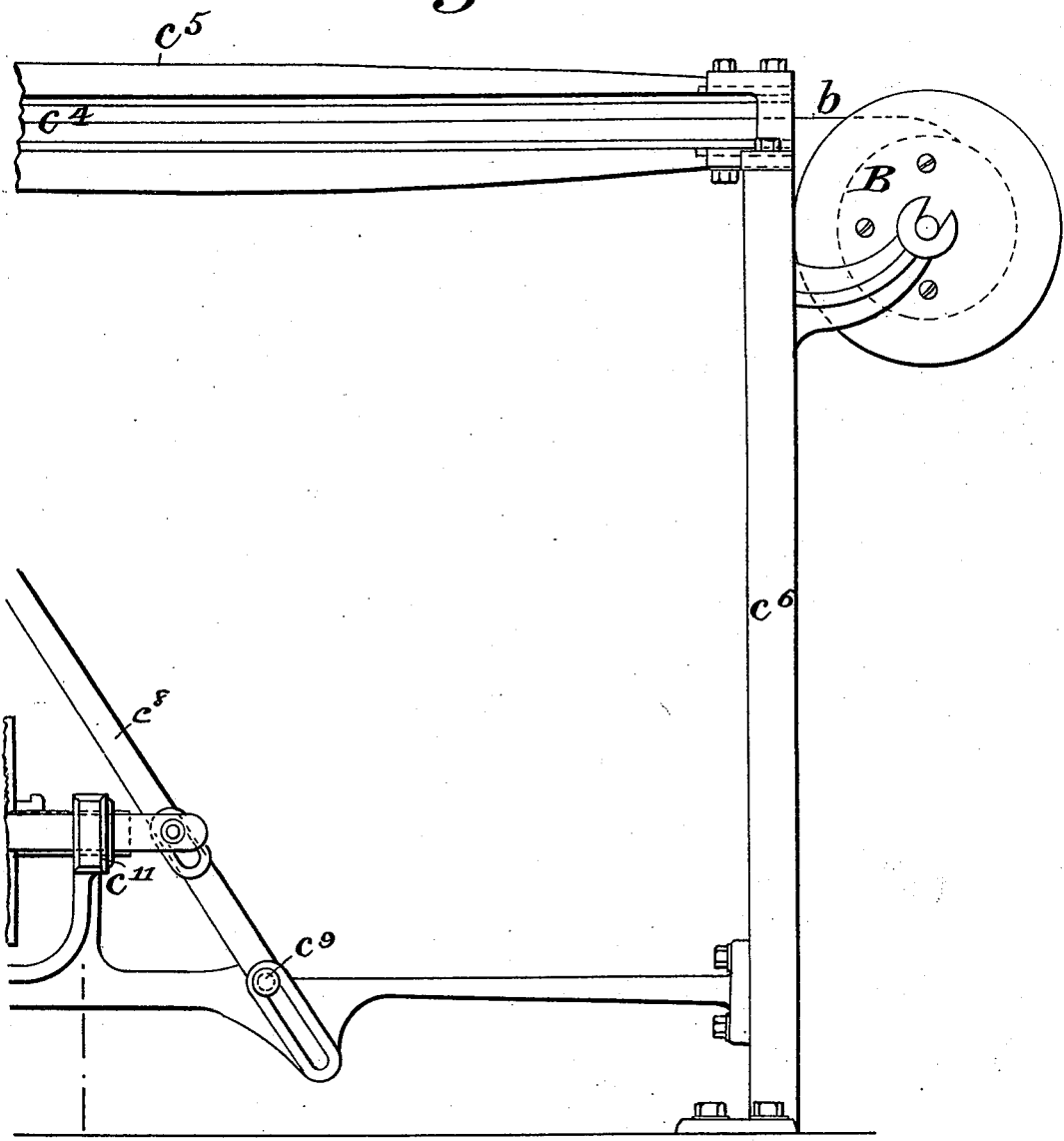

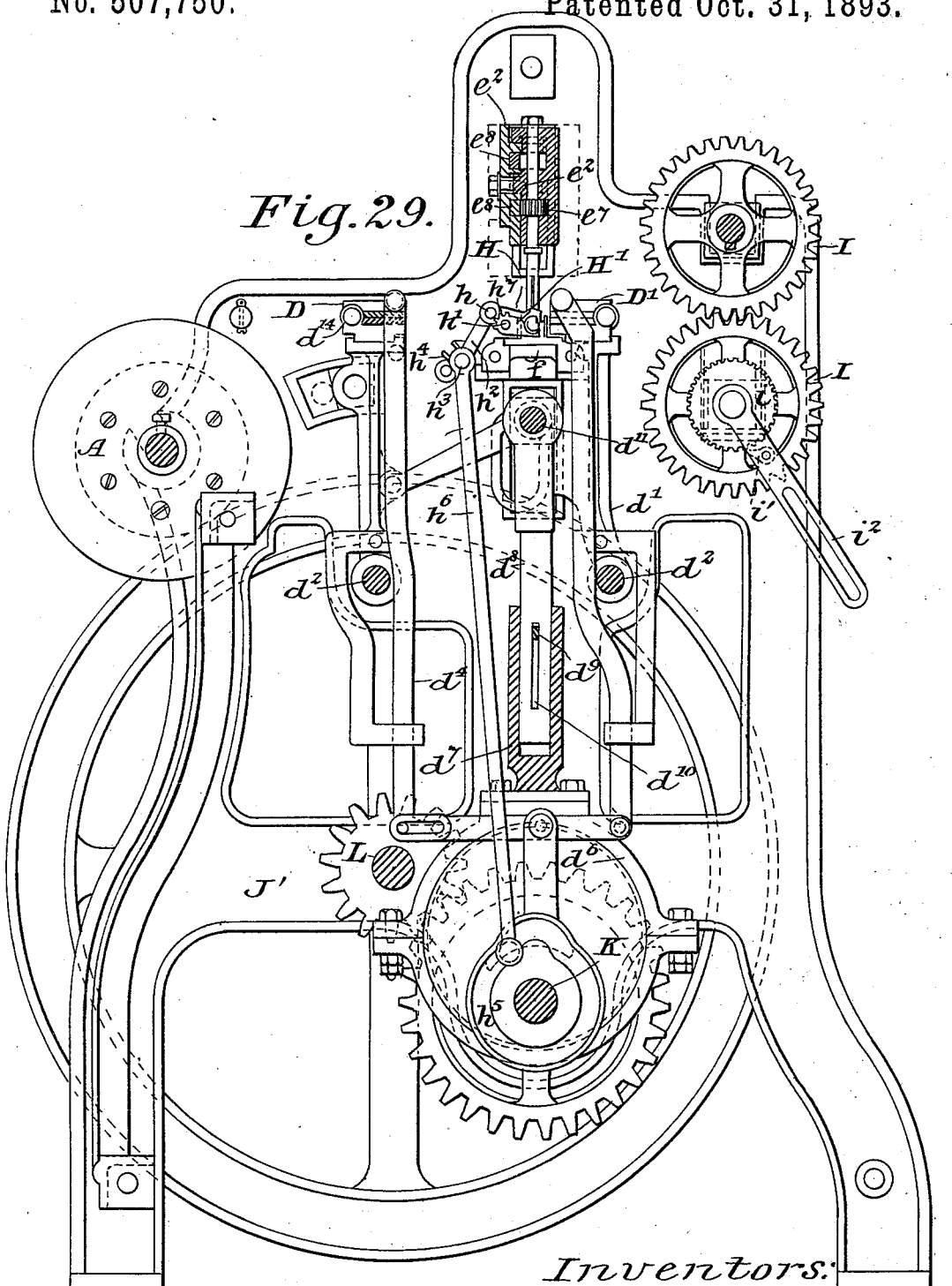

(No Model.)  10 Sheets—Sheet 10.
A. N. PEARSON & R. PENN.
METHOD OF AND APPARATUS FOR MANUFACTURING RECTANGULAR MESHED WIRE NETTING.

No. 507,750. Patented Oct. 31, 1893.

Witnesses:
E.B. Bolton
E.K. Sturtevant

Inventors:
Alfred Naylor Pearson
Robert Penn
By their Attorneys

UNITED STATES PATENT OFFICE.

ALFRED NAYLOR PEARSON, OF AUBURN, AND ROBERT PENN, OF SOUTH MELBOURNE, VICTORIA.

METHOD OF AND APPARATUS FOR MANUFACTURING RECTANGULAR-MESHED WIRE-NETTING.

SPECIFICATION forming part of Letters Patent No. 507,750, dated October 31, 1893.

Application filed September 28, 1892. Renewed October 5, 1893. Serial No. 487,294. (No model.) Patented in Victoria July 27, 1892, No. 9,824; in South Australia July 28, 1892, No. 2,277; in New South Wales July 29, 1892, No. 3,889; in Tasmania August 1, 1892, No. 1,089/10; in New Zealand August 6, 1892, No. 5,694, and in Queensland January 27, 1893, No. 2,129.

*To all whom it may concern:*

Be it known that we, ALFRED NAYLOR PEARSON, agricultural chemist, residing at Rathmines Road, Auburn, and ROBERT PENN, engineer, residing at Laurel Cottage, Montague Street, South Melbourne, in the British Colony of Victoria, subjects of the Queen of Great Britain, have invented an Improved Method of and Apparatus for Manufacturing Rectangular-Meshed Wire-Netting, of which the following is a specification.

This invention has been patented in Victoria July 27, 1892, No. 9,824; in New South Wales July 29, 1892, No. 3,889; in Tasmania August 1, 1892, No. 1,089/10; in New Zealand August 6, 1892, No. 5,694; in South Australia July 28, 1892, No. 2,277, and in Queensland January 27, 1893, No. 2,129.

This invention relates to the manufacture of wire netting having rectangular meshes. Its object is to enable wire netting of this description to be easily and cheaply manufactured.

It consists, first, in the method of manufacturing rectangular-meshed wire-netting herein described, and secondly, in the apparatus which we have devised for carrying such method into effect.

In order that our invention may be more readily understood, we will proceed at once to describe, step by step, with the aid of diagrams, how we manufacture wire-netting, and will finally describe the construction, arrangement and operation of a complete machine which we have devised for manufacturing rectangular-meshed wire-netting according to our method.

Figure 30:
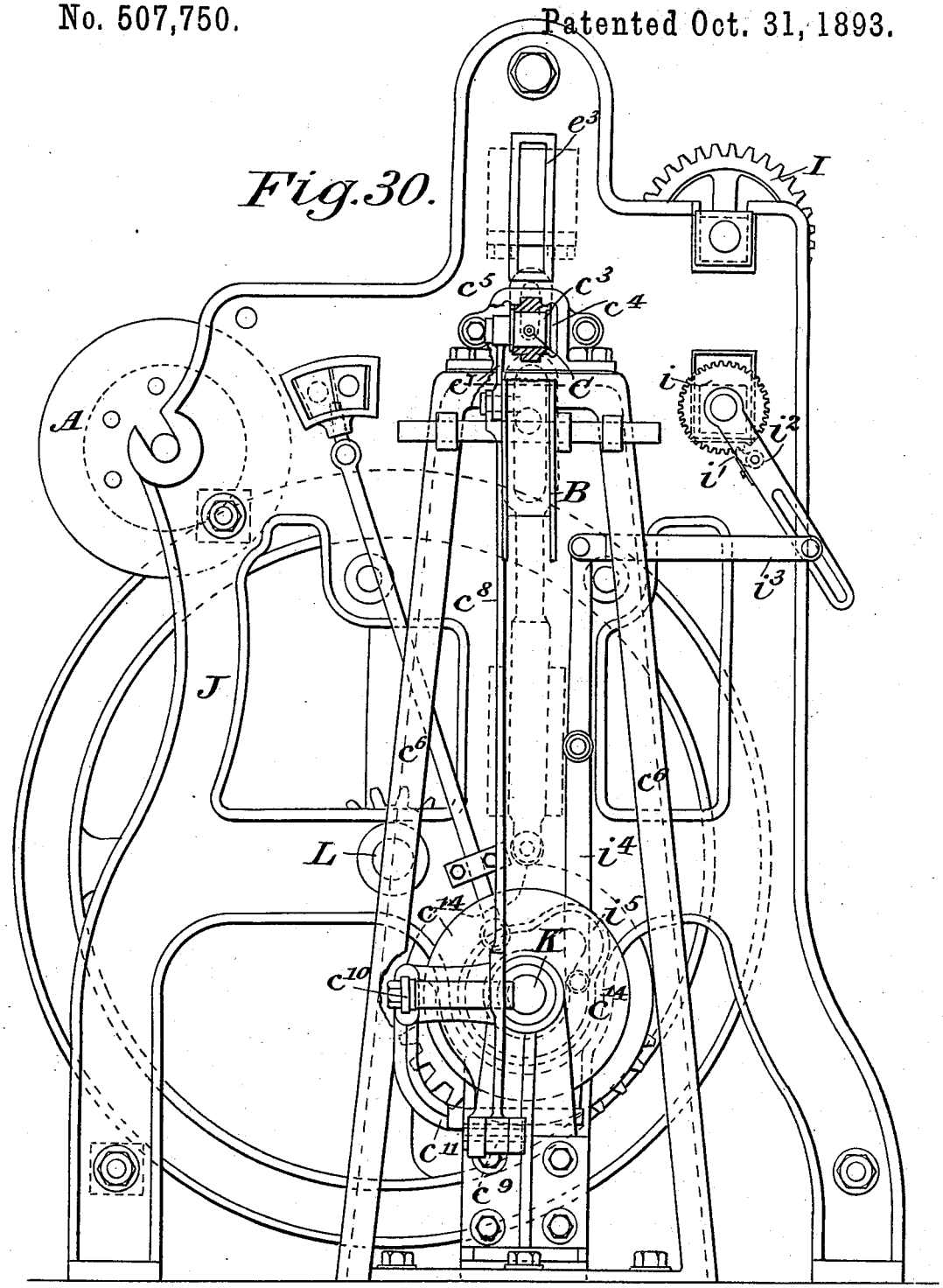

Referring to the accompanying drawings, Figures 1 to 5 are diagrammatic views illustrating the construction of rectangular-meshed wire-netting according to this invention. Fig. 6 is a diagrammatic view roughly indicating the general position and arrangement of the chief parts of a machine for manufacturing rectangular-meshed wire netting according to our invention. Fig. 7 is a perspective view of the woof wire gripping and cutting jaws. Figs. 8 to 12 are various perspective views of a pair of the loop-forming fingers and sockets used as herein described for forming loops on the warp wires of the netting. Figs. 13 and 14 are respectively a side elevation and a plan of one of the loops formed by said fingers before it is tightened up. Fig. 15 is a central longitudinal section of a needle or shuttle used for threading the woof wires through the loops formed in the warp wires. Figs. 16 and 17 are diagrammatic plans showing the device used for retaining the loops in position while they are being tightened up. Figs. 18, 18$^a$ and 19 are views illustrating the essential features of another way of making the loops in the warp wires. Figs. 20, 20$^a$ and 20$^b$ are views illustrating the finger used for making the loops as illustrated in Figs. 18, 18$^a$ and 19. Fig. 21 is a view of the loop when completed and before the finger has been drawn up out of engagement with it. Fig. 22 is a perspective view showing the way in which the loops are held in position while the needle is threading the woof wire through them. Figs. 23 and 24 are respectively a front and end elevation of the jaws used for gripping the warp wires, together with the mechanism for operating them. Fig. 25 is a perspective view illustrating a modification of the upper gripping jaw. Fig. 26 is a side elevation of the apparatus employed for operating the needle or shuttle used for threading the woof wire through the loops of the warp wires. Fig. 27 is a perspective view of the mechanism employed for operating the woof wire cutting jaws. Figs. 28, 28', 28$^2$ and 28$^3$ (on Sheets 5, 6, 7, and 8 respectively) show a side elevation of a machine which we have devised for manufacturing wire netting according to our invention, while Fig. 29 is a sectional elevation from the right hand side of the machine, and Fig. 30 is an elevation, also from the right hand side thereof.

The same letters of reference indicate the same parts in all the figures.

Figs. 1 to 4 illustrate the kind of netting for the manufacture of which this invention has been devised.

It will be seen that the fabric is formed by a series of longitudinal or warp wires $a, a,$ and a series of cross or woof wires $b, b'$ cut the desired width of the netting. There is no selvage to the netting; the woof wires *b* being arranged to project a little at the ends, and so serving the purpose of barbs. In Figs. 1 to 3 it will be seen that the warp wires are fastened to the woof wires at the intersections by being wrapped, wound or twisted round them. It will be noticed also in Fig. 1 that the twists or loops of the warp wires *a*, *a*, around the first woof wire *b*, are in the opposite direction to the twists round the second wire *b'*. The reason for this will be understood on reference to Fig. 5, it being obvious that the twist on the wire *a* has a tendency to cause the wire *b* to turn round into the position shown by the dotted lines. To overcome this the twists must be made in opposite directions, so that the tendency to turn in one direction may be neutralized by an equal tendency to turn in the opposite direction. This is provided for by the arrangement shown in Fig. 1, where the alternate twists on each warp wire are in opposite directions. It is also provided for in another way in Fig. 2, where all the twists on one warp wire are in the same direction; but the twists on the one woof wire *b* are opposite to those on the other one. In Fig. 3 this alternation of twists is not provided. This therefore is an imperfect form of netting. Our machine can make any of these three forms, but we prefer the form shown in Fig. 1.

It will be understood from the above description of the netting that the machine for manufacturing it must be a kind of weaving machine, which will make loops on the warp wires, then thread or pass the woof wires through said loops by means of a kind of shuttle-needle, and then draw the loops up tight.

The general nature of the operation is shown in Figs. 6 and 7. In Fig. 6 a number of warp wires *a*, *a* are shown by the full lines with the loops on them, and the shuttle-needle C (broken off at the near end) is represented traversing these loops from the near to the off side, so as to carry the woof wire *b* through them. In Fig. 7 the needle is supposed to have completed its journey and returned, and the warp wires have been pulled tight, by means of opposite pulls, thus closing up the loops. If the pull on the warp wires be sufficiently vigorous, the loops are closed up so tightly that they firmly grasp the woof wire, the joint being so tight that the warp wire can be made to slide on the woof wire only by means of a very considerable strain; and after the netting has been dipped in the zinc bath the joint is so firm that the wire will break before the connection between the warp and woof wires will give way.

The essential parts of the machine consist first of a pair of powerful jaws D, D' which stretch right across the warp wires and grasp them firmly. They are capable of a reciprocating motion, so that they may be caused to approach each other and afterward be caused to recede from each other. Secondly of a series of specially shaped tools hereinafter called fingers (shown at E, E, in Fig. 6), suspended in a line right across the warp wires, one finger over each wire. They admit of two movements; first an upward and downward motion, so that they may be dropped down on to the wires, and afterward raised up again; and secondly a rotatory motion around their own vertical axes. Thirdly of a series of sockets F arranged underneath the wires, one socket for each finger. Only one of these sockets is shown in Fig. 6, but it will be understood that one of them is arranged under each loop. Fourthly of a shuttle-needle C; or, more briefly, the needle. Fifthly, of a pair of small jaws G as indicated in Fig. 7, arranged on the off side of the machine, to seize hold of the end of the woof wire *b* when the needle C has completed its forward movement. Sixthly of a pair of small cutting jaws H also shown in Fig. 7 on the near side of the machine, to cut the woof wire *b* after the needle has completed its return stroke. Seventhly of a pair of feed rollers (I, Fig. 6) arranged to revolve through any desired arc so as to draw the netting through any desired distance when the operation of forming the row of meshes has been completed. Besides these essential parts, there are a few accessories, such as a reel (A, Fig. 6) to hold the coils of warp wire, and a reel (B, Fig. 6) for the coil of woof wire. Also a series of movable guides (not shown) attached to the back of the jaw D' to help in guiding the warp wires. The fingers E and finger sockets F perform besides their other functions the part of guides both for the warp and woof wires, and the row of sockets F acts as a guide for the needle C. The fingers E, sockets F and guides can be adjusted to any desired distance or distances apart, so that the distance apart of the warp wires can be varied. A roller is provided beyond the feed rollers I for rolling up the wire netting as it comes out of the machine, and suitable cams, levers, and connecting parts are provided for giving the necessary motions to the various parts of the machine. These motions are as follows:— Let it be supposed that the feed of the warp wires has just taken place, and that the jaws D and D' (Fig. 6) have closed again on said warp wires, and that the jaws D are separated from the jaws D' by the full extent of their stroke, while the fingers E are clear above the warp wires, and the needle C is held in readiness to shoot forward across the machine, the cutting jaws H being wide open, so as not to offer any obstruction to the needle in its course, and the jaws G being open ready to seize the end of the woof wire when it is carried into position by the needle C.

Movement 1. The first operation is the lowering of the fingers E through half their stroke, so that their prongs stride across the warp wires, and fit into the circular holes in the sockets prepared to receive them. This movement is clearly illustrated in Figs. 8 to 10, in which Fig. 8 shows the finger and socket in relation to the warp wire before the first movement takes place, and Figs. 9 and 10 show them after the movement has taken place, Fig. 10 being a sectional view of Fig. 9. Movement 2. The next movement is the approach of the jaws D' toward the jaws D, and simultaneously the continuance of the movement of the fingers E into the sockets F down to the bottom of their stroke. By this means the wire is bent down in a curve as shown in Fig. 11. Movement 3. The jaws D' then approach still nearer the jaws D, the jaws D also approaching the jaws D'; and at the same instant the fingers E twist round through half a circle whereby the bend in the wire becomes converted into a loop as shown in Fig. 12. This loop when formed has the appearance shown in front elevation in Fig. 13, and in plan in Fig. 14. Movement 4. The fingers E are then raised to the position shown in Fig. 8, the sockets F meanwhile remaining in position. Movement 5. The needle C makes its forward journey, carrying with it the woof wire b. Movement 6. The jaws G close and grasp the free end of the woof wire b. Movement 7. The needle C performs its return journey, sliding back on the woof wire. This will be understood on reference to Fig. 15, where the needle C is shown as being provided with two jaws or cams c pressed into engagement with the woof wire b by small springs c' so as to grip said wire on their forward movement and so carry it forward on the outward stroke while they slide freely along the wire on their return journey. The jaws or cams c are supported on pivots placed eccentrically to the curve of the surface of the jaws. There are other simple arrangements by which this end can be attained, but this is the arrangement which we prefer. Movement 8. In the next movement the jaws D, D' begin to recede from one another, the first effect being to partly close up the loop, so that the outer curves (as seen in plan) approach each other and fall within the position covered by the four prongs of the finger E, as will be understood on reference to Figs. 16 and 17, the first of which shows in plan the socket and the original loop with the woof wire passing through it, while the second shows the same after the loop has been partly closed up. It will be seen in Fig. 17 that the loop in all its parts falls well within the points $e\,e\,e\,e$, which represent the position of the points of the finger prongs. Movement 9. At this stage, while movement 8 is still proceeding, the fingers E move down into the position shown in Fig. 9, compressing the two sides of the loop close together, and keeping them thus until the loop is finally tightly drawn up by the completion of movement 8. Movement 10. At about this instant the jaws H (Fig. 7) cut off the near end of the woof wire. Movement 11. The fingers E are raised into the position shown in Fig. 8, and the jaws D, D', G and H are opened. Movement 12. The feed takes place. Movement 13. The jaws D D' again close, thus completing the cycle of operations.

*Alternative form of fingers.*—The fingers E above described and their sockets F are not the only form which may be adopted. If a piece of straight wire be grasped at each end as shown in $a$, Fig. 18, and one end be made to approach the other, the wire will bend into a curve as shown in Fig. $18^a$. This curve will be either upward, downward, sidewise or in any other direction indifferently, the wire having an equal tendency to go in any direction, and a very slight touch (as for instance with the finger and thumb as shown in Fig. 18) at the commencement of the operation, will determine the direction the curve shall take. And if during the approach of the two ends the finger and thumb are not simply drawn upward, but are also twisted round in a horizontal plane through an angle of one hundred and eighty degrees, the wire will form an upward loop as shown in Fig 19.

A form of finger E' which will serve the same purpose as the finger and thumb in the above illustration is shown in Figs. 20, $20^a$ and $20^b$, the first being a front view, and the second a half side view. The warp wire is indicated at $a$. It will be readily understood that if the fingers be lowered on to this piece of wire $a$, the wire will slip through between the two steel pads $e'$, $e'$ at the end of the fingers, and occupy the position shown in Fig. $20^b$. If, when the fingers E' are in this position, the two ends of the wire are brought nearer to each other as shown in Fig. $18^a$, and the fingers at the same time are elevated and twisted round through an angle of one hundred and eighty degrees, then a loop will be formed just as it was shown to be in Fig. 19. The arrangement will present the appearance shown in Fig. 21. A sharp pull upward will then release the fingers E' from the loop, which will then remain clear. If almost at the same instant, but a little before the fingers are thus withdrawn upward, a socket or guide F' of the form represented in Fig. 22 is brought into position from below the wire, it will hold the loop in position, and at the same time, a row of such guides will form a groove to guide the needle in its course, in the same way that the other sockets do in the first described arrangement. The socket or guide in Fig. 22 will in the after operations serve the purpose of the prongs in the first described form of finger.

*General arrangement of parts.*—The relative positions of the essential parts of the machine will be clearly understood from Figs. 6 and 7. For further details reference may be made to the more complete drawings shown in Figs. 23 to 30. All the cams are by preference arranged on one shaft, placed in a direct line below the fingers and sockets, while the fingers are supported by means of an over-head frame, and are rotated by means of a rack or racks sliding backward and forward in that frame; and the whole frame containing fingers and rack-work is supported on uprights which rise or fall according to the motion of their proper cams, as will hereinafter be more specifically described.

Figs. 23 and 24 show the general arrangement of the large warp jaws, showing them, together with the mechanism for operating them, detached from the machine. In these figures D, D', represent as before the two pairs of jaws which are supported on the upright arms $d$, $d'$. These latter are centered on the two shafts $d^2$, mounted in fixed bearings (not shown). The upper jaw of each pair closes on the lower jaw by means of two powerful spiral springs $d^3$, attached to the ends of the upper jaws, and looping on to the shafts $d^2$. The tension of these springs can be regulated by adjusting screws, (not shown) and is so adjusted that after the pull on the warp wires has exceeded a certain point the wires can slip through the jaws. Hence there will be no risk of breaking the wires by over straining. The jaws can be opened by means of the rods $d^4$ and cams $d^5$, and they are made to approach and recede from each other by means of the eccentrics $d^6$. An eccentric has been adopted in this case instead of a cam, because the pushing force to be exerted is very great, and the wear and tear on an ordinary cam would be greater than on an eccentric; but a cam or any other similar arrangement may be used if preferred. The cam shaft K is supported by fixed bearings (not shown in the figures) in the frame of the machine. The eccentric rods $d^7$ $d^8$ are of course always in motion, and if no special arrangement were provided they would cause the jaws to be always in motion, but the jaws have to be kept for a great part of the time in a state of rest. To provide for this the eccentric rods are made in two separate pieces, the upper piece $d^8$ sliding in the lower piece $d^7$ (shown in section in Fig. 24). A pin $d^9$ is passed through the lower section $d^7$, and passes through a slot $d^{10}$ in the upper section $d^8$, so that the section $d^8$ can move the section $d^9$ only when the pin $d^9$ reaches the top or the bottom of the slot $d^{10}$.

In Fig. 24 the points $d^2$ $d^2$ and K are fixed, and the point $d^{11}$ is capable of moving upward and downward in a perpendicular line, guide slots (not shown in Figs. 23 and 24) being provided for this purpose. The eccentric $d^6$, as shown in Fig. 24, is at the top of its stroke. As it proceeds downward it will bring down with it the pin $d^9$, and when this has reached the bottom of the slot $d^{10}$, it will bring down with it the rod $d^8$, and will therefore lower the point $d^{11}$. The effect of this on the jaws D D' will be, since the pin or point $d^{11}$ slides down the curved slot $d^{12}$, that the jaws D' will be pushed back, and the effect on the jaws D will be that they also will be pushed back because the toggle link or rod $d^{13}$ will be drawn down into a horizontal position. The jaws D move about three times the distance that the jaws D' do.

In Fig. 24 the upper jaws of each pair are shown attached to the lower ones by hinges $d^{14}$. An alternative arrangement is to have the upper jaw not attached to the lower jaw but simply placed on it, as shown in Fig. 25, an upright projection $d^{14}$ from the lower jaw fitting into a slot in the ends of the upper jaw.

The mechanism for operating the needle is shown in Fig. 26. In this illustration C is the needle, and $c^2$ its head or part where the cams or jaws $c$ (shown in Fig. 15) are arranged. A block $c^3$ is fixed upon the needle C and is capable of sliding to and fro along a horizontal slot $c^4$ formed by the bars $c^5$ which are supported at one end by one of the main standards (J) of the machine, and at the other end by a special standard $c^6$. The block $c^3$ is joined by the connecting piece $c^7$ to a long lever, $c^8$, which is fulcrumed at $c^9$ on a pin or bolt passing through some fixed part of the framing of the machine. Power is applied to this lever $c^8$ by the sliding rod $c^{10}$, which slides in fixed bearings $c^{11}$. This rod is made to slide backward and forward by means of the pin $c^{12}$ engaging in the groove $c^{13}$ of the cam $c^{14}$ on the cam shaft K, that is on the same shaft which carries the eccentrics $d^6$ (Figs. 23 and 24) and the other cams. The needle C, lever $c^8$ and sliding rod $c^{10}$ are of the lightest construction possible, consistent with the required strength, so that the inertia and momentum may be small, and the motion easy and swift. The reel B containing the coil of wire is kept slowly revolving by a special arrangement not shown in the drawings, so that the wire will hang loose and offer no obstruction to the easy movement of the needle.

The stroke of the needle can be shortened, when desired, by moving the fulcrum point from $c^9$ down toward the bottom of the slot in the lower end of the lever $c^8$. This is to provide for making netting of different widths. To the same end the cutting jaws H Fig. 7, can be moved (within certain limits) to any desired position nearer to the jaws G. When making narrower netting, such of the fingers and sockets on the near side of the machine as may not be required will be taken out, so as not to obstruct the needle and the cutting jaws.

Of the pair of woof wire cutting jaws H H' the upper jaw H works on the rod $h$ as a center, as clearly illustrated in Figs. 27 and 29; and the lower jaw H' works on the rod $h'$ as a center; the said rods $h$ and $h'$ being supported at their ends in fixed bearings in the frame of the machine. The backward crank arm $h^2$ of the upper jaw H has a rod $h^3$ passing through it, and said rod has a small upward and downward motion in the slots $h^4$ $h^4$, and is operated by a cam $h^5$ through the medium of the rods $h^6 h^6$. This motion will of course be conveyed to the cutting edge of jaw H, and it is also conveyed to the cutting edge of the lower jaw H', because the jaws are geared together by teeth $h^7$. The two jaws H H' can be slid along the bars $h\ h'$ and $h^3$ into any desired position.

The parts which we have already described constitute the essential features of the machine. They are arranged in practice preferably as illustrated in Figs. 28, 29 and 30, where the same letters are used to indicate the same parts that are employed in the previous figures, in order that the parts already described may be easily traced. For instance, A represents the reel containing the warp wires, B the reel containing the woof wires, C the needle for threading the latter through the loops formed in the warp wires by the fingers E while said wires are held by the jaws D D', and F F represent the sockets arranged underneath the fingers E E. G, as before, represents the jaws used for holding the end of the woof wire $b$ when fed through the loops in the warp wires and H represents the jaws used for cutting off the woof wire after the row of meshes has been made. J J' represent the main standards of the main frame of the machine, and K the shaft upon which the cams and eccentrics used for operating the various parts of the machine are secured.

The gripping jaws D D', together with their opening or closing and reciprocating mechanism, and the needle C together with its reciprocating mechanism having been already fully described, we will proceed to describe those details which have not yet been explained.

The fingers E are mounted in a horizontal frame or bar $e^2$ arranged to slide vertically in slots $e^3$ provided for the purpose in the frame of the machine and supported on the upper ends of vertically sliding rods or bars $e^4$, whose lower ends are provided with small antifriction rollers $e^5$ which rest upon and are acted upon by cams $e^6$ secured on the cam shaft K. Each of these fingers E is free to rotate horizontally, that is, round its own vertical axis, and is provided with a small pinion $e^7$ which is in engagement with a rack $e^8$ arranged to slide horizontally in the frame $e^2$ carrying said fingers and adapted to be operated by a lever $e^9$, centered upon a bracket $e^{10}$ secured to the frame of the machine and acted upon at its lower end by a face cam $e^{11}$ so that said lever will be rocked and thus be caused to reciprocate the rack $e^8$ and thereby partially rotate the fingers E through the requisite angle of one hundred and eighty degrees. When it is required to form the loops in the warp wires in opposite directions on the alternate wires, as illustrated in Fig. 2, we prefer to employ two racks $e^8$, and to connect them together by a rocking link $e^{12}$ (Fig. 28), so that when one rack is moved in one direction the other is moved in the opposite one, the effect being, as these racks are in gear with pinions $e^7$ on alternate fingers as shown in said Fig. 28, to partially rotate each alternate finger in opposite directions. The sockets F are mounted in a fixed frame $f$ (Fig. 29) below the fingers E. The lower jaw of the pair G which is used for gripping the end of the woof wire $b$ when fed forward by the needle C is provided with a rigid rod $g$ whose lower end is actuated upon by a cam $g'$ of the requisite shape on the cam shaft K in a similar way that the jaws H H' used for cutting off the woof wire $b$ when one row of meshes has been completed are operated upon by a cam $h^5$ through the medium of rod $h^6$, as hereinbefore described with reference to Figs. 27 and 29.

The rollers I, used for drawing the wire netting through the machine as it is manufactured, are geared together as illustrated in Fig. 29, and the spindle of the lower roller is fitted with a ratchet wheel $i$, with which a pawl $i'$ on an arm $i^2$ is arranged to engage. This arm is connected by a rod $i^3$ (Fig. 30) with the upper end of a lever $i^4$, whose lower end is acted upon by a cam $i^5$, so that said rolls will be partially rotated at intervals as required.

Motion is imparted to the cam shaft K, and therefore to the various moving parts of the machine, by means of a shaft L gearing therewith and provided with fast and loose pulleys, a fly wheel, and a clutch, as illustrated.

We wish it to be understood that we are not bound to any particular form of machine as regards its details. For instance, although we have arranged the warp wires in a horizontal plane as being most convenient—because when so arranged the netting as it comes out of the machine can be dipped at once into a zinc bath placed at the back of the loom, before being finally rolled up—it will be obvious that they might be placed in a vertical plane if preferred. The relative position of the cams on the cam shaft may also be varied, and the cam shaft may be placed overhead if desired, while the needle might be reciprocated by other arrangements than the lever shown in Figs. 26 and 28. For instance, it might be reciprocated by the device known as lazy tongs. The form of finger described in this specification might also be varied, as will be readily understood by all practical men; and indeed the machine can be varied in many details, and arrangement of parts without departing from the spirit of this invention. It will also be evident that two or more needles may be placed parallel to each other, and be arranged to thread two or more woof wires simultaneously through two or more parallel series of loops made on the warp wires, so as to make two or more rows of meshes at once.

Having now particularly described and ascertained the nature of our said invention and in what manner the same is to be performed, we declare that what we claim is—

1. The herein described method of manufacturing rectangular-meshed wire netting, the essential feature of which consists in forming loops in a series of warp wires, then threading a woof wire or wires through such loops, and finally drawing the latter tightly around said woof wires, all substantially as and for the purposes herein described and explained, and as illustrated in the accompanying drawings.

2. In combination, with reciprocating holding jaws D, D' for the warp wires, means for forming loops therein, and a needle or shuttle carrying the woof wires adapted to pass through the loops of the warp wires, substantially as described.

3. In combination with the reciprocating jaws for the looped warp wires, a needle or shuttle carrying a woof wire, a pivoted lever $c^8$ for operating the shuttle, and means for operating the lever, substantially as described.

4. In combination with the gripping jaws D, D' for the warp wires, means for moving the same toward and from each other to form a loop, and a shuttle for the woof wire adapted to pass through the loops of the warp wires, substantially as described.

5. In combination, with means for holding the warp wires, a series of fingers with means for lowering the same into engagement with the wires, rotating the fingers to form a loop, and disengaging the fingers from the loops, and a shuttle C for the woof wires adapted to pass through the loops thus formed, substantially as described.

6. The combination of supports for the warp wires, means for forming loops therein, and a socket or sockets F for the loops of the wires, with a shuttle carrying the woof wire adapted to pass through the loops, substantially as described.

7. In combination, with supports for the warp wires, means for forming loops therein, a shuttle carrying the woof wire and adapted to pass through the loops, and gripping jaws G engaging the end of the woof wires, substantially as described.

8. In combination, with supports for the warp wires, means for forming loops therein, a shuttle carrying the woof wire and adapted to pass through the loops, gripping jaws G for the woof wire, and cutting jaws H, substantially as described.

9. In combination, with means for holding the warp wires, vertically operating spring fingers having means for turning the same to loop the woof wires, substantially as described.

10. In combination, with means for holding the warp wires and means for forming loops therein, a loop support having a channel for the loop and the passage of the shuttle, and notches for the wires, substantially as described.

In witness whereof we have hereunto set our hands in presence of two witnesses.

ALFRED NAYLOR PEARSON.
ROBERT PENN.

Witnesses:
WALTER SMYTHE BAYSTON,
WILLIAM GUEST HOLDEN.